(12) United States Patent
Sun

(10) Patent No.: US 8,373,986 B2
(45) Date of Patent: Feb. 12, 2013

(54) ENCLOSURE OF ELECTRONIC DEVICE

(75) Inventor: Zheng-Heng Sun, Taipei Hsien (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 238 days.

(21) Appl. No.: 12/954,661

(22) Filed: Nov. 25, 2010

(65) Prior Publication Data

US 2012/0090888 A1 Apr. 19, 2012

(30) Foreign Application Priority Data

Oct. 19, 2010 (CN) .......................... 2010 1 0511554

(51) Int. Cl.
*H05K 7/20* (2006.01)

(52) U.S. Cl. .............. 361/695; 361/679.47; 361/679.48; 361/679.5; 361/679.51; 361/694; 165/80.3; 165/104.33; 165/121; 165/122; 165/185; 454/184

(58) Field of Classification Search ................ 361/679.46–679.54, 690–697, 361/715–722; 454/184, 186; 165/80.3, 104.33, 165/104.34, 121–126, 185; 174/15.1, 16.3, 174/252; 257/706–727
See application file for complete search history.

(56) References Cited

U.S. PATENT DOCUMENTS

| | | | | |
|---|---|---|---|---|
| 6,654,244 B2 * | 11/2003 | Laufer et al. | ................... | 361/695 |
| 6,678,157 B1 * | 1/2004 | Bestwick | ....................... | 361/695 |
| 7,679,920 B2 * | 3/2010 | Musciano et al. | ............ | 361/721 |
| 8,081,453 B2 * | 12/2011 | Sun | ............................... | 361/690 |
| 8,179,679 B2 * | 5/2012 | Slagle | ........................... | 361/720 |
| 2010/0157522 A1 * | 6/2010 | Refai-Ahmed | .......... | 361/679.54 |

FOREIGN PATENT DOCUMENTS

| | | | |
|---|---|---|---|
| JP | 403268483 A | * | 11/1991 |
| JP | 02009277707 A | * | 11/2009 |

* cited by examiner

*Primary Examiner* — Michail V Datskovskiy
(74) *Attorney, Agent, or Firm* — Altis Law Group, Inc.

(57) ABSTRACT

An enclosure includes a bracket with a bottom wall, a circuit board mounted to the bottom wall but spaced from the bottom wall, an electronic element mounted to the circuit board, a fan arranged on the bottom wall and facing the space between the circuit board and the bottom wall, and a guiding member attached to the circuit board to block the space between the circuit board and the bottom wall.

7 Claims, 4 Drawing Sheets

ENCLOSURE OF ELECTRONIC DEVICE

BACKGROUND

1. Technical Field

The disclosure relates to an enclosure of an electronic device.

2. Description of Related Art

Cooling fans are often used to dissipate heat within electronic enclosures. In some situations airflow is generated by fans to both sides of a motherboard mounted on a wall inside the enclosure. However, heat may be mostly generated on the side of the motherboard facing away from the wall and only a little heat generated from the side facing the wall. Therefore, the airflow between the motherboard and the wall is more than needed and so is wasted.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

The disclosure, including the accompanying drawings, is illustrated by way of examples and not by way of limitation. It should be noted that references to "an" or "one" embodiment in this disclosure are not necessarily to the same embodiment, and such references mean at least one.

Figure 1:
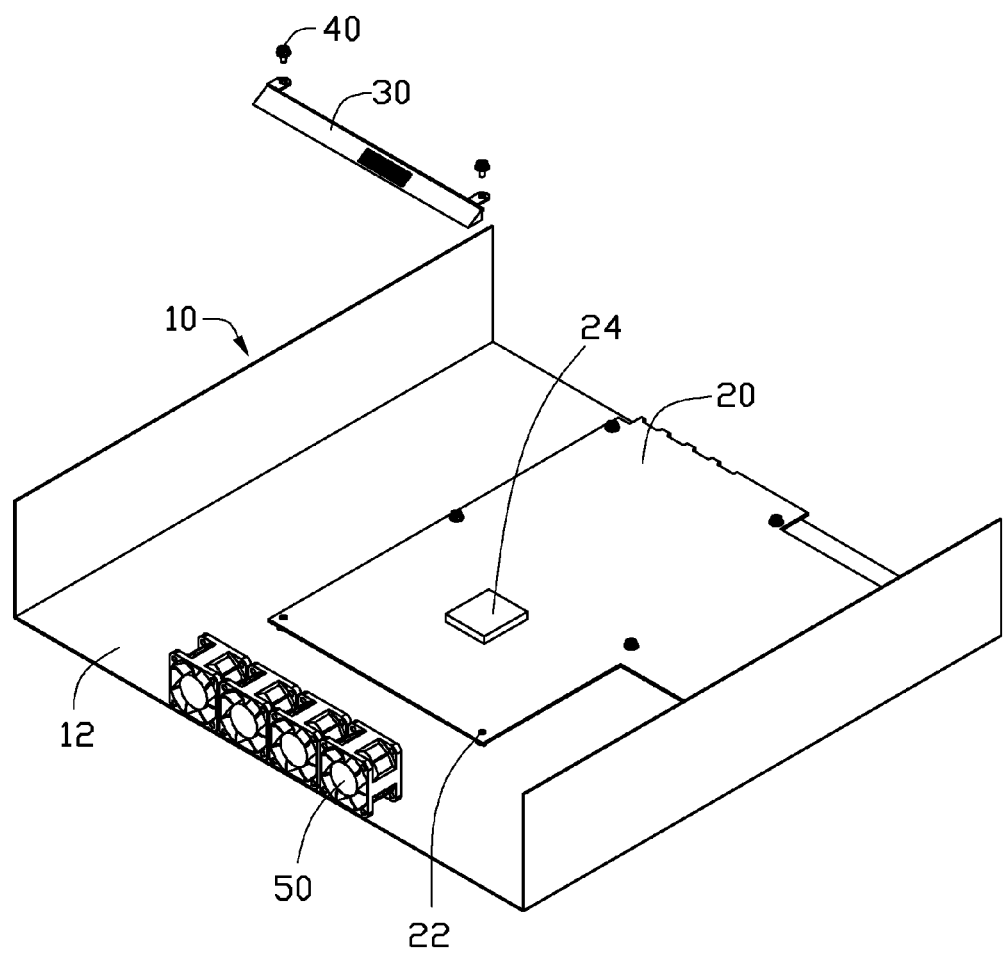
FIG. 1 is an isometric, exploded view of an embodiment of an enclosure, the enclosure includes a guiding member.
Figure 2:
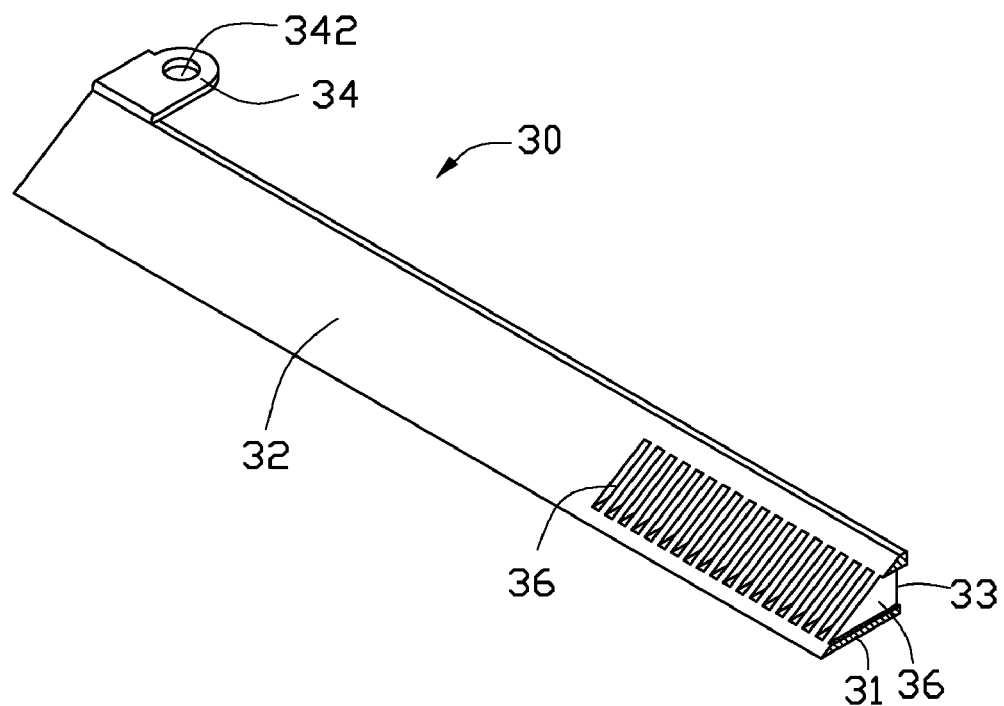
FIG. 2 is an enlarged, isometric view of the guiding member of FIG. 1.

Referring to FIGS. 1 and 2, an enclosure includes a bracket 10, a circuit board 20, a guiding member 30, two fasteners 40, and a plurality of fans 50. In this embodiment, the fasteners 40 are screws.

The bracket 10 includes a bottom wall 12. The circuit board 20 is mounted to but spaced from the bottom wall 12. The circuit board 20 is parallel to the bottom wall 12. The fans 50 are arranged on an end of the bottom wall 12, with the airflow of the fans 50 aligning with the circuit board 20. The airflow of the fans 50 can flow through a space above the circuit board 20 and the space between the circuit board 20 and the bottom wall 12.

The circuit board 20 defines two mounting holes 22 adjacent to the fans 50. An electronic element 24, such as a central processing unit, is mounted on the circuit board 20. An upper portion 242 of the electronic element 24 is arranged on the circuit board 20, and a lower portion 244 of the electronic element 24 is arranged under the circuit board 20 in the space between the bottom wall 12 and the circuit board 20, as shown in FIG. 4.

The guiding member 30 is hollow and substantially triangular-prism shaped. The guiding member 30 includes a bottom surface 31, a sloped surface 32 slantingly connected to a side of the bottom surface 31, and a side surface 33 connected between the sloped surface 32 and an opposite side of the bottom surface 31. Two mounting pieces 34 extend from opposite ends of a conjunction of the sloped surface 32 and the side surface 33. Each mounting piece 34 defines a through hole 342. A plurality of parallel vents 36 is defined in a middle portion of the sloped surface 32 through the side surface 33.

Figure 3:
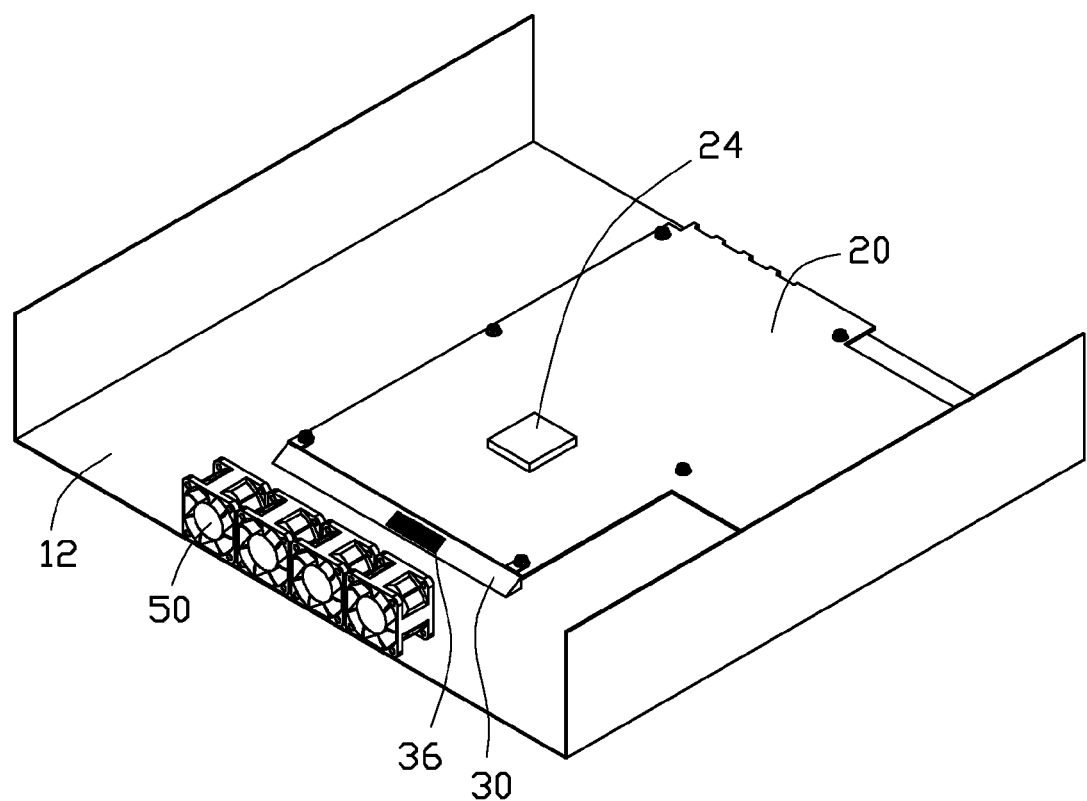
FIG. 3 is an isometric, assembled view of FIG. 1.

Referring to FIG. 3, in assembly, the guiding member 30 is arranged on the bottom wall 12 between the fans 50 and the circuit board 20, with the vents 36 aligning with an opening of the space between the bottom wall 12 and the circuit board 20. The fasteners 40 extend through the through holes 342 of the guiding member 30 and screw into the mounting holes 22 of the circuit board 20. The bottom surface 31 of the guiding member 30 is in tight contact with the bottom wall 12. The side surface 33 of the guiding member 30 engages with an edge of the circuit board 20. The sloped surface 32 of the guiding member 30 faces the fans 50.

Figure 4:
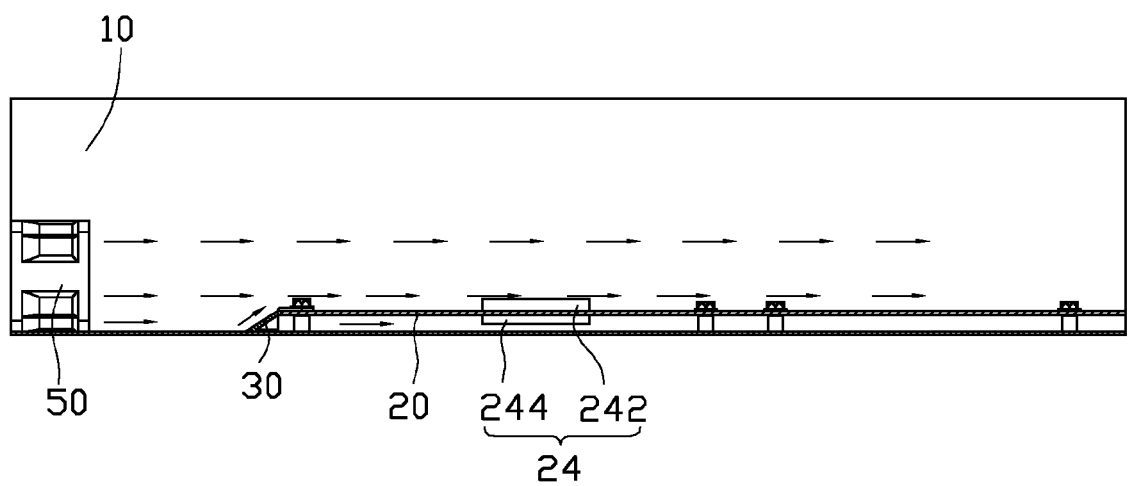
FIG. 4 is a cross-sectional, side plan view of FIG. 3.

Referring to FIG. 4, in use, a majority of airflow from the fans 50 is guided to flow along the sloped surface 32 to above the circuit board 20. A small portion of the airflow flows through the vents 36 of the guiding member 30 to dissipate heat from the bottom portion 244 of the electronic element 24.

Obviously, the position of the vents 36 on the guiding member 30 can be adjusted according to the position of the bottom portion 244 of the electronic element 24. In this embodiment, the guiding member 30 guides the majority of airflow, which would otherwise flow through the space between the bottom wall 12 and the circuit board 20, to flow above the circuit board 20 where it will be more useful.

It is to be understood, however, that even though numerous characteristics and advantages of certain embodiments have been set forth in the foregoing description, together with details of the structures and functions of the embodiments, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. An enclosure, comprising:
   a bracket comprising a bottom wall;
   a circuit board mounted to but spaced from the bottom wall, an electronic element mounted on the circuit board;
   a fan arranged on the bottom wall and aligning with the space between the circuit board and the bottom wall; and
   a guiding member attached to the circuit board between the fan and the circuit board, to block the space between the circuit board and the bottom wall;
   wherein the guiding member is substantially triangular-prism shaped.

2. The enclosure of claim 1, wherein the guiding member comprises a bottom surface, a sloped surface slantingly connected to a side of the bottom surface, and a side surface connected between the sloped surface and an opposite side of the bottom surface, the bottom surface of the guiding member is in tight contact with the bottom wall, the side surface of the guiding member engages with an edge of the circuit board, the sloped surface of the guiding member faces the fan.

3. The enclosure of claim 2, wherein a plurality of vents are defined in the sloped surface through the side surface, to align with the space between the circuit board and the bottom wall.

4. The enclosure of claim 1, wherein two mounting pieces extend from opposite ends of a top of the guiding member respectively, each mounting piece defines a mounting hole, two fasteners extend through the through holes of the guiding member and screw into the circuit board.

5. The enclosure of claim 4, wherein the plurality of vents of the guiding member aligns with the electronic element.

6. An enclosure, comprising:
a bracket comprising a bottom wall;
a circuit board mounted to but spaced from the bottom wall, an electronic element mounted on the circuit board;
a fan arranged on the bottom wall and aligning with the space between the circuit board and the bottom wall; and
a guiding member attached to the circuit board between the fan and the circuit board, to block the space between the circuit board and the bottom wall;
wherein the guiding member comprises a bottom surface, a sloped surface slantingly connected to a side of the bottom surface, and a side surface connected between the sloped surface and an opposite side of the bottom surface, the bottom surface of the guiding member is in tight contact with the bottom wall, the side surface of the guiding member engages with an edge of the circuit board, the sloped surface of the guiding member faces the fan.

7. An enclosure, comprising:
a bracket comprising a bottom wall;
a circuit board mounted to but spaced from the bottom wall, an electronic element mounted on the circuit board;
a fan arranged on the bottom wall and aligning with the space between the circuit board and the bottom wall; and
a guiding member attached to the circuit board between the fan and the circuit board, to block the space between the circuit board and the bottom wall;
wherein two mounting pieces extend from opposite ends of a top of the guiding member respectively, each mounting piece defines a mounting hole, two fasteners extend through the through holes of the guiding member and screw into the circuit board.

* * * * *